United States Patent Office 3,424,845
Patented Jan. 28, 1969

3,424,845
3,5-DINITROSALICYLIC ACID, 5-NITROFURFU-
RYLIDENE HYDRAZIDE AND COMPOSITIONS
CONTAINING AND METHODS EMPLOYING
THE SAME FOR THE CONTROL OF HISTO-
MONIASIS
Edward W. Berndt and Robert D. Vatne, Charles City,
Iowa, assignors to Salsbury Laboratories, a corporation
of Iowa
No Drawing. Continuation-in-part of applications Ser. No.
525,300, Feb. 7, 1966, and Ser. No. 598,921, Dec. 5,
1966. This application May 25, 1967, Ser. No. 641,112
U.S. Cl. 424—232                                10 Claims
Int. Cl. A61k 27/00; C07d 5/30

ABSTRACT OF THE DISCLOSURE

The new chemical compound 3,5-dinitrosalicylic acid, 5-nitrofurfurylidene hydrazide, compositions containing the same and its synergetic precursors, and treatments applying said compounds and compositions for the promotion of growth and the control of Histomoniasis in poultry.

CROSS-REFERENCES RELATED

This application is a continuation-in-part of copending applications Ser. No. 525,300, filed Feb. 7, 1966, and Ser. No. 598,921, filed Dec. 5, 1966.

This invention relates to novel methods and compositions which have an outstanding potency in promoting the growth and meat producing capacity in poultry and in the prophylactic and curative control of Blackhead infections. The invention is also directed to a new chemical compound which is the active and responsible factor underlying these physiological and chemotherapeutic effects.

Blackhead is a gastrointestinal disease which occurs in turkeys of all ages and may also affect a wide variety of other avian species, such as chickens, guineas, quails, pheasants and peafowl. To the veterinarian it is known as Histomoniasis and Infectious Enterohepatitis in view of its clinical symptoms manifested by an inflamation of the ceca and liver. The etiological factor of the disorder is a microscopic flagellate protozoan identified as *Histomonas meleagridis*. The parasite is mostly harbored by the common poultry cecal worm *Heterakis gallinarum*, and its eggs in which it is able to live for long periods of time. It is mainly this source of infection which is responsible for the transmission of the disease.

Birds contract the disease by consuming feed or water contaminated with the droppings containing the infectious organism, or by swallowing cecal worms or their eggs harboring the parasite. Clinical manifestations of the disorder are a lowered head, drooping wings and tails, drowsiness, ruffled feathers, dullness, loss of appetite, a persisting yellowish or sulfur-colored diarrhea and a slight depression of temperature. As a rule, young poults are susceptible to a rapid onset and short course of the disease, and succumb soon after the appearance of the first symptoms. Adult birds are usually sick for several days before they die and show excessive wasting of flesh. A postmortem examination exposes multiple ulcerations and lesions of the cecal wall, forming yellowish-green cores in the ceca. It has a disagreeable, putrid odor which is the result of tissue destruction. The lesions of the liver consist of irregular, reddened, or gray spots to large necrotic areas. In advanced cases, the peritoneum and mesenteric tissues become involved.

The prognosis of the disease, especially in turkeys, is most unfavorable. Mortality is high and may attain a rate of 100% of the flock. The heaviest losses occur during the first three months of life, but are not limited to that age. Very frequently an outbreak is observed during the breeding season. In some regions, marked particularly by heavy rainfalls and wet growing seasons, such as the Midwest and East, the epizootic damage has been so severe that it once compelled a temporary abandonment of this branch of poultry husbandry.

We have discovered that a new type of heterocyclic compounds possesses a specific and potent activity against the pathogenic factor of Blackhead disease. The compound is a derivative of 5-nitrofurfural in which the carbonyl oxygen of the 5-nitrofuraldehyde is replaced by 3,5-dinitrosalicyl hydrazide so as to form 3,5-dinitrosalicylic acid, 5-nitrofurfurylidene hydrazide as represented by the following configuration

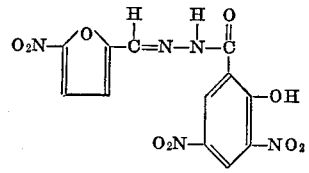

For more convenient reference the compound will hereinafter also be referred to as NFSH. It is a yellow solid, crystalline and odorless substance and has a melting point of 227 to 229° C.

NFSH may be prepared by reacting 3,5-dinitrosalicylic acid hydrazide with 5-nitrofurfural compounds whose substituent groups in the 2-position have reactive capability when contacted with a hydrazide to form a hydrazone derivative having the general structure

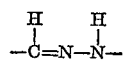

More particularly, it may be synthesized by interaction of 3,5-dinitrosalicylic acid hydrazide with 5-nitrofurfural or its lower acylal or acetal derivatives.

According to a preferred form of this invention our new compound is produced by the action of 5-nitrofurfurylidene diacetate with 3,5-dinitrosalicylic acid hydrazide as outlined in the following equation:

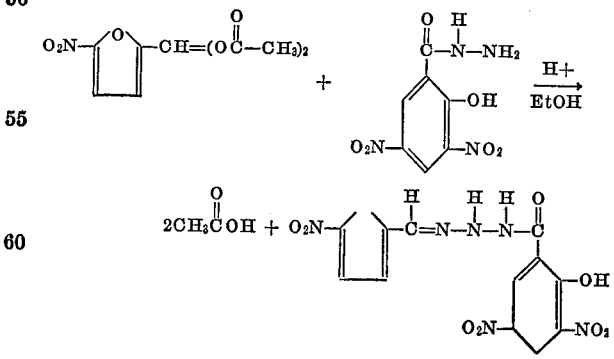

The starting material 5-nitrofurfurylidene diacetate is a compound known in the art and may be synthesized from furfural, nitric acid and acetic anhydride as described by Gilman and Wright in the Journal of the American Chemical Society, vol. 52 (1930), pp. 2550–54. The 3,5-dinitrosalicylic acid hydrazide may be easily obtained from an ester of the 3,5-dinitrosalicylic acid with hydrazine in accordance with the classical method of ammonolysis.

The following example will serve as an illustration of the synthesis of NFSH:

EXAMPLE 1

3,5-dinitrosalicylic acid, 5-nitrofurfurylidene hydrazide

Seventeen grams (0.07 mole) of 3,5-dinitrosalicylic acid hydrazide were suspended in a mixture of 200 ml. of alcohol, 100 ml. of water, and 10 ml. of sulfuric acid. Thereupon 17 grams (0.07 mole) of 5-nitrofurfurylidene diacetate were added to the suspension which was then heated just below the boiling point for one-half hour. The mixture was cooled and filtered and the resulting condensate was washed with aqueous denatured ethanol and subsequently with water. The material was dried at 110° C. and the final product was obtained in yield of 23.5 grams (88.7%). After recrystallization from acetic acid, its melting point was determined at 227–229° C. The substance on analysis was found to contain:

Carbon (calculated value 39.46) _____ 39.10
Hydrogen (calculated value 1.93) _____ 2.05
Nitrogen (calculated value 19.18) _____ 19.40

NFSH is soluble in dimethylsulfoxide to the extent of about 6 g./100 cc. and 1.5 g./100 cc. in dimethylformamide at room temperature. Its solubility in other common organic solvents was less than 0.3 g./100 cc. Its solubility in water is 0.034 g./100 cc. at 24° C.

In exploring the histomonicidal activity of NFSH we have observed the singular and interesting phenomenon that it performs its function regardless of whether it is introduced into the metabolic system of the animal as such in form of its synthetic entity, or is generated therein by anabolic formation from its precursors. As will be apparent from the above given configuration, NFSH is composed of two structural moieties, namely

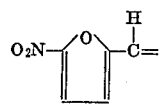

the 5-nitrofurfurylidene or A-portion, and

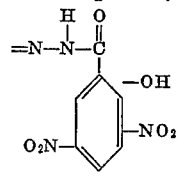

the 3,5-dinitrosalicylic acid hydrazide or B-position.

As heretofore explained the compound results from the reaction of 3,5-dinitrosalicylic acid hydrazide and 5-nitrofurfural compounds whose substituent groups in the 2-position are capable of hydrazone condensation, such as its lower aclylal and acetal derivatives. Thus, for example, the chemotherapeutic effect of NFSH may be induced by the simultaneous oral or parenteral administration of 3,5-dinitrosalicylic acid hydrazide and 5-nitrofuraldehyde or 5-nitrofurfurylidenediacetate.

The in vivo formation of NFSH from 5-nitrofuraldehyde and 3,5-dinitrosalicylic acid hydrazide was proved by the following experiment.

EXAMPLE 2

Two five week old turkeys were kept without food overnight. One bird was then given a single oral dose of a mixture of 0.25 g. of 5-nitrofuraldehyde plus 0.47 g. of 3,5-dinitrosalicylic acid hydrazide enclosed in a gelatine capsule. The other turkey received a double dose of this mixture. Three hours following the administration of the said precursor compounds fecal specimens from each bird were assayed by thin-layer chromatography. A combination of chloroform and methanol in the proportion of 2:1 was used as the developing solvent. The bird receiving the double dose was sacrificed 5 hours after medication and specimens of fluids and solids were collected from the proventriculus, the ventriculus (gizzard), the duodenum, the ileum and the bile. These specimens, as well as excrements taken 24 hours after administration from the surviving bird were then chromatographed. To confirm the identity of the presumed spot, bile and excretory specimens were chromatographed in two different solvent systems, one a mixture of 99 parts of ethanol and 1 part of ammonia, and the other equal amounts of chloroform and acetic acid. The separated components were rendered visible by spraying the plate with a solution of 0.10% p-dimethylaminocinnamaldehyde and 20% titanium trichloride.

The chromaographic assay of the excreta which were collected 3 hours after the administration of the two aforementioned precursors of NFSH revealed a spot on the plate whose $R_f$ value corresponded to that of NFSH=0.88 in the $CHCl_3:CH_3OH$ (2:1) solvent system. The response of the excrements in mixture with synthetic NFSH on the same plate was accentuated by an enrichment of the presumptive spot, indicating the presence of NFSH within less than 3 hours.

Chromatographic analysis of specimens from various levels of the intestinal tract also demonstrated the presence of NFSH in the gizzard, ileum and bile.

Chromatograms of bile, gizzard and excretory specimens in other solvents confirmed the in vivo formation of NFSH. Chromatograms developed 24 hours after medication revealed barely identifiable amounts of NFSH.

For the purpose of this disclosure the chemotherapeutic effect of NFSH and its synergetic precursors will be illustrated by their application against *Histomonas meleagridis* in turkeys for which they are especially adapted. Their remedial action has been demonstrated in terms of suppression of clinical symptoms and reduction of mortality rates in artificially infected birds.

In accordance with our invention the active ingredients may be introduced into the animal organism in any fashion or manner in which they are apt to form and/or build up and maintain an effective blood- or tissue-level of NFSH. This can be accomplished either by parenteral or oral dispensation at suitable dosage levels.

Parenteral dispensation is preferably carried out by the peritoneal route in suspension in a convenient, non-toxic suspending medium, such as carboxymethyl cellulose on the 12th day after artificial inoculation. Oral administration may be either by single dosage enclosed in gelatine capsules or by incorporation of the active drugs into a solid, nontoxic and ingestible vehicle in which it is uniformly and homogeneously dispersed. Inactive carriers of ingestible nature are any kind of vegetable food material such as ground corn, corn meal, dried distiller's grain, citrus meal, ordinary grain, mash, scratch and any other normal or commercial rations. The so-medicated feed rations are placed before the birds for consumption ad libitum. The drug may also be used as active ingredient in liquid compositions which can be conveniently prepared by means of drinking water in which it is suspended with the help of skim milk, edible oils, syrups, wetting agents and emulsifiers.

When parenterally dispensed, as little as 50 mg. of NFSH effected a 100% survival rate, while at least twice the amount of each precursor was needed to bring about a chemotherapeutic response to a concurrent injection in pari situ.

Oral treatment by single dosage units is likewise applied on the 12th day after infection and requires a minimum of 50 mg. of NFSH, and twice that amount of each precursor given at the same time.

In feed the active proportions for the precursor mixture start at the approximate level of 0.01% for each of the synergetic components. The minimum remedial dosage of NFSH as synthetic material was determined at 0.002% by weight of the feed, but concentrations up to 0.2% and even higher may be used for more effective action, particularly in case of a moderately heavy exposure of a flock. Preferred proportions for prophylactic control lie within the approximate range of 0.005 to 0.01%.

EXAMPLE 3

A given number of Broad Breasted Bronze turkey poults were reared in wire-bottom cages enclosed in brooding rooms. When these poults were about 6 weeks of age, they were placed in individual cages, having hardware-cloth bottoms, where they remained for 2 to 3 days. This period of isolation allowed the poults to get accustomed to their new quarters before the tests were started. The lot was then divided into 2 groups each of equal numbers. One of the groups was placed on medication on the day of infection and remained on medication for 21 days, while the other infected group remained untreated and served as controls. Medicated feed rations were placed before the infected birds for ingestion ad libitum. The birds were held under observation for an additional seven days after medication to determine the extent of possible relapses.

Artificial infection was carried out by administration of approximately 1,000 embryonated eggs of the cecal worm of chickens, known as *Heterakis gallinarum*. During all the experiments, weight and feed consumption records were kept on each poult under test. It was found that at the dosage levels dispensed, no detrimental effect on the natural growth or weight increase of the birds was caused by the active ingredient of the compositions.

The results of the trials were tabulated in the following tables. Column 1 records the compounds applied. Column 2 shows the number of turkeys employed in each test, followed by column 3 listing the dosage levels used. Column 4 records the clinical incidence in terms of the number of birds manifesting symptoms of the disease. These values are translated in column 5 into clinical efficacy expressed in percentages. Column 6 shows the mortality rates in terms of dead birds which are then converted into survival efficacy by percentages in column 7.

TABLE I

| Compound | Single dosage treatment (oral) | | | | | |
|---|---|---|---|---|---|---|
| | No. turkeys | Dosage, mg. | Clin. incidence | Clin. efficacy | Mort. | Surv. rate, percent |
| | 4 | Inf. controls | 4 | 0 | 3 | 25 |
| 5-nitrofurfurylidene diacetate | 4 | 100 | 4 | 0 | 4 | 0 |
| 3,5-dinitrosalicylic acid hydrazide | 4 | 100 | 4 | 0 | 4 | 0 |
| 5-nitrofuraldehyde | 4 | 100 | 4 | 0 | 3 | 25 |
| 5-nitrofurfurylidene diacetate + 3,5-dinitrosalicylic acid hydrazide | 4 | 100 + 100 | 4 | 0 | 2 | 50 |
| 5-nitrofuraldehyde + 3,5-dinitrosalicylic acid hydrazide | 4 | 100 + 100 | 4 | 0 | 2 | 50 |
| NFSH | 4 | 50 | 4 | 0 | 0 | 100 |
| NFSH | 4 | 100 | 4 | 0 | 1 | 75 |
| NFSH | 4 | 200 | 4 | 0 | 1 | 75 |

TABLE II

| Compound | Single dosage treatment (intraperitoneal) | | | | | |
|---|---|---|---|---|---|---|
| | No. turkeys | Dosage, mg. | Clin. incidence | Clin. efficacy | Mort. | Surv. rate, percent |
| | 4 | Inf. controls | 4 | 0 | 3 | 25 |
| 5-nitrofurfurylidene diacetate | 4 | 100 | 4 | 0 | 4 | 0 |
| 3,5-dinitrosalicylic acid hydrazide | 4 | 100 | 4 | 0 | 4 | 0 |
| 5-nitrofuraldehyde | 4 | 100 | 4 | 0 | 3 | 25 |
| 5-nitrofurfurylidene diacetate + 3,5-dinitrosalicylic acid hydrazide | 4 | 100 + 100 | 4 | 0 | 0 | 100 |
| 5-nitrofuraldehyde + 3,5-dinitrosalicylic acid hydrazide | 4 | 100 + 100 | 4 | 0 | 0 | 50 |
| NFSH | 4 | 100 | 4 | 0 | 0 | 100 |
| NFSH | 4 | 200 | 4 | 0 | 0 | 100 |
| NFSH | 4 | 50 | 4 | 0 | 0 | 100 |

TABLE III.—MEDICATED FEED TREATMENT WITH NFSH PRECURSORS

| Compound | No. turkeys | Dosage, percent | Clin. incidence | Clin. efficacy | Mort. | Surv. rate, percent |
|---|---|---|---|---|---|---|
|  | 4 | Inf. controls | 4 | 0 | 4 | 0 |
| 5-nitrofurfurylidene diacetate | 4 | 0.0250 | 4 | 0 | 4 | 0 |
| 3,5-dinitrosalicylic acid hydrazide | 4 | 0.0250 | 4 | 0 | 4 | 0 |
| 5-nitro-2-furaldehyde | 4 | 0.0250 | 4 | 0 | 4 | 0 |
| 5-nitrofurfurylidene diacetate + 3,5-dinitrosalicylic acid hydrazide | 4 | 0.0250 + 0.0250 | 1 | 75 | 0 | 100 |
| 5-nitrofuraldehyde + 3,5-dinitrosalicylic acid hydrazide | 4 | 0.0250 + 0.0250 | 0 | 100 | 0 | 100 |
| 3,5-dinitrosalicylic acid hydrazide | 4 4 | 0.0332 0.0166 | 4 4 | 0 0 | 4 4 | 0 0 |
| 5-nitrofurfurylidene diacetate | 4 4 | 0.0333 0.0167 | 3 4 | 25 0 | 3 4 | 25 0 |
| 5-nitrofuraldehyde | 4 | 0.0193 | 4 | 0 | 4 | 0 |
| 3,5-dinitrosalicylic acid hydrazide + 5-nitrofurfurylidene diacetate | 4 | 0.0332 + 0.0333 | 0 | 100 | 0 | 100 |
| 3,5-dinitrosalicylic acid hydrazide + 5-nitrofurfurylidene diacetate | 4 | 0.0166 + 0.0167 | 4 | 0 | 2 | 50 |
| 3,5-dinitrosalicylic acid hydrazide + 5-nitrofuraldehyde | 4 | 0.0332 + 0.0193 | 0 | 100 | 0 | 100 |
| 3,5-dinitrosalicylic acid hydrazide | 4 | 0.0100 | 4 | 0 | 4 | 0 |
| 5-nitrofuraldehyde | 4 | 0.0100 | 4 | 0 | 4 | 0 |
| 5-nitrofuraldehyde + 3,5-dinitrosalicylic acid hydrazide | 4 | 0.0100 + 0.0100 | 3 | 25 | 1 | 75 |

TABLE IV.—MEDICATED FEED TREATMENT WITH SYNTHETIC NFSH

| No. turkeys | Dosage level, percent | Clinical incidence | Clinical efficacy, percent | Mortality rate | Survival efficacy, percent |
|---|---|---|---|---|---|
| 81 | (¹) | 81 | ---------- | 81 | ---------- |
| 44 | 0.0020 | 15 | 65.9 | 9 | 79.5 |
| 26 | 0.0025 | 6 | 76.9 | 2 | 93.3 |
| 44 | 0.0030 | 9 | 79.5 | 0 | 100.0 |
| 44 | 0.0040 | 7 | 84.1 | 0 | 100.0 |
| 107 | 0.0050 | 4 | 96.3 | 0 | 100.0 |
| 33 | 0.0060 | 0 | 100.0 | 0 | 100.0 |
| 14 | 0.0075 | 0 | 100.0 | 0 | 100.0 |
| 11 | 0.0100 | 1 | 90.9 | 0 | 100.0 |
| 17 | 0.0150 | 0 | 100.0 | 0 | 100.0 |
| 3 | 0.0250 | 0 | 100.0 | 0 | 100.0 |
| 18 | 0.0300 | 0 | 100.0 | 0 | 100.0 |
| 2 | 0.0400 | 0 | 100.0 | 0 | 100.0 |
| 8 | 0.0500 | 0 | 100.0 | 0 | 100.0 |
| 4 | 0.1000 | 0 | 100.0 | 0 | 100.0 |
| 4 | 0.2000 | 0 | 100.0 | 0 | 100.0 |

¹ Inf. controls.

As will be apparent from the foregoing tables, the efficacy of the synthetic drug is about 12 to 22 times superior to that of the precursor mixture, especially when the treatment is carried out in form of a medicated diet for a period of 21 days.

The foregoing Table IV shows that all the 81 infected but untreated controls showed severe clinical symptoms several days after inoculation and had succumbed to the disease at the end of the 21-day experimental period. Contrary thereto, test birds receiving a protective NFSH dosage of 0.002% in the feed showed a comparative clinical efficacy of 65.9% and a survival efficacy of almost 80%. All the infected poults receiving a medicated ration containing from 0.003% up were increasingly free of clinical symptoms and attained a survival rate of 100% after 21 days. No relapses were noted after 7 additional days of observation.

The new compound has also been found to be of beneficial value in productive poultry management which is geared to the objective of ensuring and maintaining the growth and health of the animals. While proper nourishment, enriched with nutritional adjuvants, in conjunction with sanitizing measures is vital for rearing a healthy and productive flock, economic efficiency and profitability in the poultry industry make it equally desirable to enhance the physiological development and growth of the animals above and beyond their natural rate of maturation. In so promoting the meat producing capacity of his flocks, the poultry raiser will be in the position to bring his birds to market at an earlier date and thereby not only increase the effectiveness of his commercial operation, but also achieve substantial savings in nutritive supplies, especially when the treatment simultaneously heightens the feed efficiency of the supplemental basal rations.

We have discovered that these valuable results are produced by NFSH as will be demonstrated herein below by a number of tests conducted on turkeys. Conveniently, the mode of administration of the compound likewise consists in its incorporation into an orally ingestible non-toxic vehicle, such as an animal feed as hereinbefore described.

In the tests tabulated below, 18 newly hatched male and female turkey poults were treated for 8 weeks with dosages of 50, 200, 600, and 1200 parts per million of NFSH in the feed. Control groups of 18 male and female poults each received no dietary treatment. The mean weight gains were determined by carefully maintained weight records for each bird and the ratios of weight increases were calculated. These figures multiplied by 100 represent the percentages of weight gains attained by the treated birds as compared with the untreated controls. Thus, for example, if the mean weight gain for a group of tested turkeys was found to be 4.87 lbs. while the control group showed a value of 4.58 lbs., the percentage of weight gain expressed as Ratio $T/C$ percent is $$\frac{4.87}{4.58} \times 100 = 106.3$$

which means that the stimulative action of the chemical produces an increase in meat producing capacity of 6.3%.

Table I is divided into 2 sections and summarizes the experimental findings for male and female poults respectively. Column 1 lists the amount of active ingredient which was added to solid feed. Column 2 records in lbs. the starting weight of the birds after they were hatched, and column 3 the terminal weight upon the conclusion of the 8-week period of treatment. In column 4 are tabulated the weight gains in lbs., while column 5 translates these values into T/C percent ratios.

TABLE I

| Conc. feed, p.p.m. | Starting weight (lbs.) | Terminal weight (lbs.) | Weight gain (lbs.) | T/C, percent |
|---|---|---|---|---|
| Males: | | | | |
| 0 (controls) | 0.12 | 4.70 | 4.58 | 100.00 |
| 50 | 0.13 | 5.00 | 4.87 | 106.33 |
| 200 | 0.12 | 5.10 | 4.98 | 108.73 |
| 600 | 0.13 | 5.40 | 5.27 | 115.06 |
| 1,200 | 0.12 | 4.80 | 4.68 | 102.18 |
| Females: | | | | |
| 0 (controls) | 0.13 | 4.00 | 3.87 | 100.00 |
| 50 | 0.13 | 4.10 | 3.97 | 102.58 |
| 200 | 0.13 | 4.20 | 4.07 | 105.17 |
| 600 | 0.12 | 4.70 | 4.58 | 118.35 |
| 1,200 | 0.13 | 4.20 | 4.07 | 105.17 |

As can be seen from the foregoing table, the growth promoting activity of NFHS may rise to a level of 115–118% which is a significant increase over the fleshing rate of normal physiological development.

Compound NFSH and its precursors may be dispensed in its medium of administration either alone or in combination with other health promoting or disease control agents. Such additional ingredients may be selected from the group of vitamins, antibiotics and other growth stimulants. Especially, 3 - nitro-4-hydroxyphenylarsonic acid, arsanilic acid, and a variety of known coccidiostats or Blackhead remedies which will be readily apparent to the veterinarian may be used.

For practical purposes of marketing and to facilitate the handling of the minute amounts of our novel remedies to be incorporated into the ultimate feed rations, it is most desirable and advantageous to prepare a standard concentrate of active ingredients which may be as high as 95% by weight of the composition. To that effect, nontoxic, inert materials such as fuller's earth, talcum, bentonite, ground oyster shells, limestone, divers clays, soybean meal, wheat middlings, corn germ meal and corn meal may be selected as the carrier medium. Such stock concentrates are specifically made and adapted for use in dilutions with an alimentary dispensing vehicle or element of sustenance so as to compound the medicated rations at their desired dosage levels with utmost convenience. The availability of such commercial concentrates or premixes, therefore, is indispensable to the feed manufacturer and poultry raiser who ordinarily uses a standard weight package of premix for each 1,000 lbs. or one ton of commercial feed to produce the medicated compositions.

What we claim is:
1. 3,5-dinitrosalicylic acid, 5-nitrofurfurylidene hydrazide represented by the formula

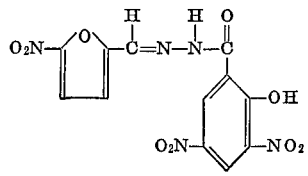

2. A veterinary composition useful in the control of Histomoniasis in poultry containing a nontoxic, orally ingestible vehicle and an effective but nontoxic amount of the compound defined in claim 1.

3. A veterinary composition effective in the control of Histomoniasis in poultry containing a nontoxic, orally ingestible vehicle and from 0.002% to 0.2% by weight of the compound defined in claim 1.

4. A veterinary composition effective in the control of Histomoniasis containing a turkey feed comprising from 0.002 to 0.2% by weight of the compound defined in claim 1.

5. A veterinary composition effective in promoting the meat producing capacity of poultry containing from 0.005% to 0.12% by weight of the compound defined in claim 1 and a poultry feed.

6. A veterinary composition effective in the control of Histomoniasis in poultry consisting of a gelatine capsule enclosing an amount of 50 mg. to 200 mg. of the compound defined in claim 1.

7. A veterinary composition effective in the control of Histomoniasis in poultry consisting of an injectible nontoxic suspending medium containing an amount of 50 mg. to 200 mg. of the compound defined in claim 1.

8. A method of controlling Histomoniasis in poultry comprising orally administering to poultry afflicted with Histomoniasis an effective, but nontoxic amount of the compound defined in claim 1.

9. A method of controlling Histomoniasis in poultry comprising parenterally administering to poultry afflicted with Histomoniasis an effective, but nontoxic amount of the compound defined in claim 1.

10. A composition suitable for addition to a poultry foodstuff comprising a non-toxic inert solid carrier material and at least 5% by weight of the compound defined in claim 1.

References Cited
UNITED STATES PATENTS
3,330,724   7/1967   Van Essen et al. ____ 167—53.1

ALBERT T. MEYERS, *Primary Examiner.*

R. BARRESE, *Assistant Examiner.*

U.S. Cl. X.R.
99—4; 260—240, 347.3